United States Patent
Sasaki

(10) Patent No.: US 7,643,383 B2
(45) Date of Patent: Jan. 5, 2010

(54) MULTIPLE LAYERS OPTICAL RECORDING FOR RECORDING DATA OVER TWO OR MORE LAYERS

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/935,555

(22) Filed: Sep. 8, 2004

(65) Prior Publication Data

US 2005/0030874 A1    Feb. 10, 2005

Related U.S. Application Data

(63) Continuation of application No. PCT/JP2004/002824, filed on Mar. 5, 2004.

(30) Foreign Application Priority Data

Mar. 25, 2003   (JP)  ............................. 2003-083305
May 28, 2003   (JP)  ............................. 2003-150355
Oct. 14, 2003   (JP)  ............................. 2003-353504

(51) Int. Cl.
    *G11B 21/08*      (2006.01)
(52) U.S. Cl. ................. 369/30.2; 369/275.3; 369/275.1
(58) Field of Classification Search ................ 369/30.2, 369/30.08, 30.06, 30.1, 30.11, 30.12, 30.16, 369/30.18, 94, 275.1, 275.3
See application file for complete search history.

(56) References Cited

U.S. PATENT DOCUMENTS

| 5,781,516 | A | * | 7/1998 | Yamada | .................... 369/30.13 |
|---|---|---|---|---|---|
| 5,881,032 | A | * | 3/1999 | Ito et al. | .................... 369/30.1 |
| 5,920,527 | A | * | 7/1999 | Aoki | .................... 369/30.15 |
| 5,930,225 | A | * | 7/1999 | Ishida et al. | .................... 369/275.1 |
| 6,108,291 | A | * | 8/2000 | Ono et al. | .................... 369/47.11 |
| 6,370,091 | B1 | * | 4/2002 | Kuroda | .................... 369/30.08 |
| 6,728,186 | B2 | * | 4/2004 | Weijenbergh et al. | .... 369/59.25 |
| 6,785,206 | B1 | * | 8/2004 | Lee et al. | .................... 369/275.3 |
| 6,788,629 | B1 | * | 9/2004 | Lee et al. | .................... 369/13.25 |
| 6,788,630 | B1 | * | 9/2004 | Lee et al. | .................... 369/13.25 |
| 6,801,494 | B2 | * | 10/2004 | Ross | .................... 369/275.3 |
| 6,917,579 | B2 | * | 7/2005 | Thompson et al. | .................... 369/275.4 |
| 7,016,289 | B2 | * | 3/2006 | Sasaki | .................... 369/59.25 |
| 7,068,578 | B2 | * | 6/2006 | Matsuba | .................... 369/53.24 |
| 7,082,092 | B2 | * | 7/2006 | Weijenbergh et al. | .... 369/59.25 |
| 7,164,640 | B2 | * | 1/2007 | Sasaki | .................... 369/53.2 |
| 7,227,831 | B2 | * | 6/2007 | Tokumoto | .................... 369/275.1 |
| 7,289,401 | B2 | * | 10/2007 | Horibata | .................... 369/47.1 |
| 7,324,422 | B2 | * | 1/2008 | Sasaki | .................... 369/53.44 |
| 7,339,868 | B2 | * | 3/2008 | Suzuki | .................... 369/53.2 |

(Continued)

FOREIGN PATENT DOCUMENTS

JP      9-7308      1/1997

(Continued)

*Primary Examiner*—Tan X Dinh
(74) *Attorney, Agent, or Firm*—Dickstein Shapiro LLP

(57) ABSTRACT

An optical disk having a dual layer layout includes two recording layers each having a data area for recording information. An optical information recording apparatus handles the two data areas of the two recording layers of the optical disk as a single continuous data area and divides the continuous data area into plural divided areas such as sessions and fragments. The optical information recording apparatus then records data on each of the sessions or fragments corresponding to the divided areas.

18 Claims, 12 Drawing Sheets

U.S. PATENT DOCUMENTS

| | | | |
|---|---|---|---|
| 7,385,897 B2* | 6/2008 | Matsuba | 369/53.24 |
| 7,423,952 B2* | 9/2008 | Shishido et al. | 369/94 |
| 2002/0024902 A1 | 2/2002 | Sasaki | |
| 2002/0114245 A1 | 8/2002 | Sasaki | |
| 2002/0159353 A1 | 10/2002 | Sasaki | |
| 2003/0033475 A1 | 2/2003 | Sasaki | |
| 2003/0133369 A1 | 7/2003 | Sasaki | |
| 2003/0163638 A1 | 8/2003 | Sasaki | |
| 2003/0223338 A1 | 12/2003 | Sasaki | |
| 2003/0231559 A1* | 12/2003 | Suzuki | 369/30.1 |
| 2004/0057366 A1 | 3/2004 | Sasaki | |
| 2004/0090886 A1 | 5/2004 | Sasaki | |
| 2004/0133739 A1 | 7/2004 | Sasaki | |
| 2004/0160875 A1 | 8/2004 | Sasaki | |
| 2004/0213117 A1 | 10/2004 | Sasaki | |
| 2004/0264322 A1* | 12/2004 | Shishido et al. | 369/47.22 |
| 2005/0025015 A1* | 2/2005 | Horibata | 369/53.3 |
| 2005/0030864 A1* | 2/2005 | Tokumoto | 369/53.2 |
| 2005/0063290 A1* | 3/2005 | Suzuki | 369/275.1 |
| 2005/0068865 A1* | 3/2005 | Kawakami et al. | 369/47.22 |
| 2006/0176784 A1* | 8/2006 | Ryu | 369/30.1 |
| 2006/0262696 A1* | 11/2006 | Woerlee | 369/94 |
| 2008/0144455 A1* | 6/2008 | Sasaki | 369/47.15 |

FOREIGN PATENT DOCUMENTS

| | | |
|---|---|---|
| JP | 9-259527 | 10/1997 |
| JP | 10-21673 | 1/1998 |
| JP | 11-232836 | 8/1999 |
| JP | 2001-126255 | 5/2001 |
| JP | 2002-150607 | 5/2002 |
| JP | 2003-16648 | 1/2003 |
| JP | 2003-59194 | 2/2003 |
| JP | 2003-168221 | 6/2003 |
| WO | WO 2004/086394 | 10/2004 |

* cited by examiner

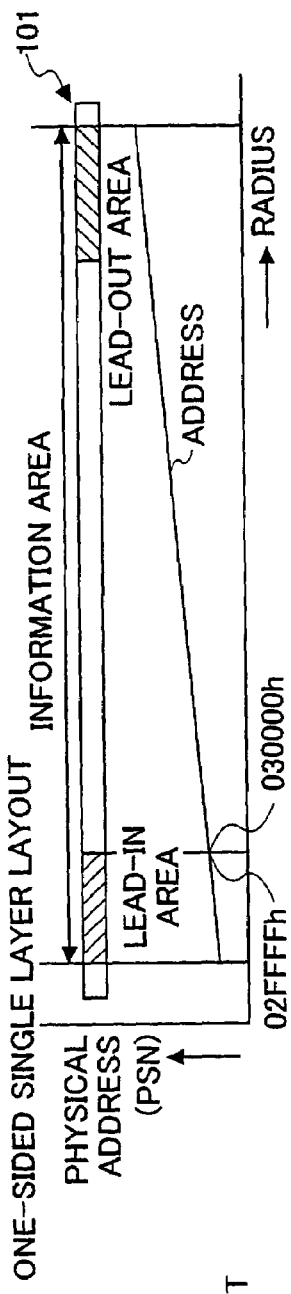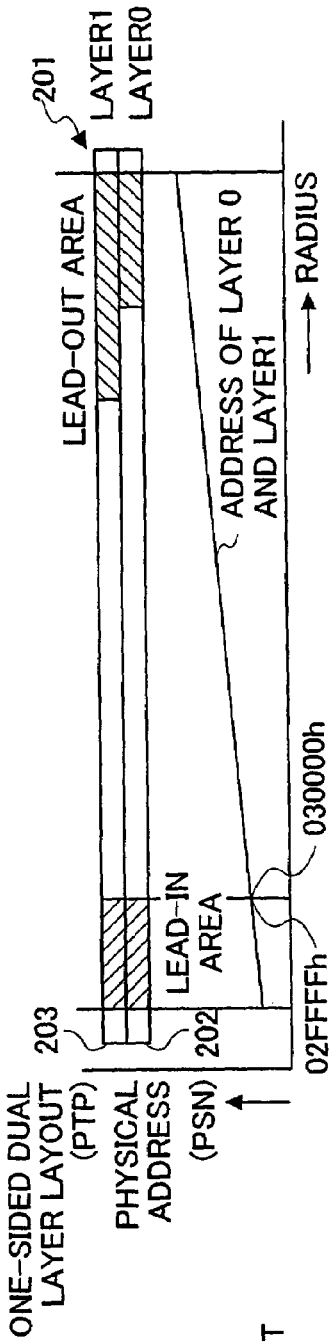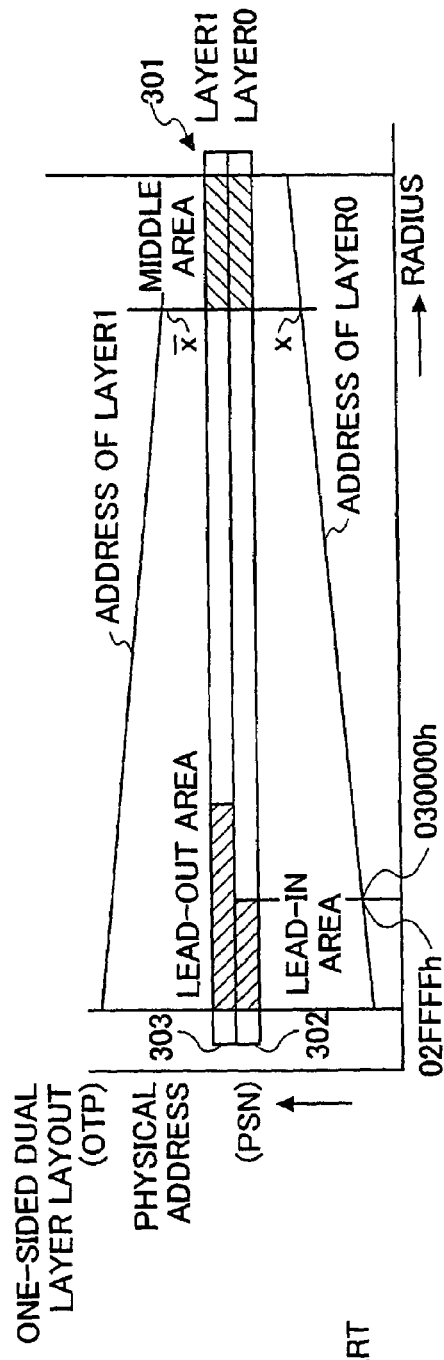
FIG.2A PRIOR ART
FIG.2B PRIOR ART
FIG.2C PRIOR ART

FIG.4

FORMAT OF SESSION DISK CONTROL BLOCK(SDCB)

| PHYSICAL ADDRESS OF ECC BLOCK | BYTE POSITION | DESCRIPTION | BYTES |
|---|---|---|---|
| 0 | D0 to D3 | CONTENT DESCRIPTOR | 4 |
| 0 | D4 to D7 | UNKOWN CONTENT DESCRIPTOR ACTION | 4 |
| 0 | D8 to D39 | DRIVE ID | 32 |
| 0 | D40 to D42 | SESSION NUMBER | 2 |
| 0 | D42 to D63 | RESERVED | 22 |
| 0 | D64 to D95 | DISK ID (ONLY LEAD-IN AREA) | 32 |
| 0 | D96 to D127 | DEPENDING ON USE | 32 |
| 0 | D128 to D143 | SESSION ITEM 0 | 16 |
| 0 | ... | ... | |
| 0 | D128+I×16 to D143+I×16 | SESSION ITME 1 | 16 |
| 0 | ... | ... | |
| 0 | D128+(N-I)×16 to D143(N-I)×16 | SESSION ITEM N | 16 |
| 0 | D128+N×16 to D2047 | RESERVED | 1920-N×16 |
| 1 to 15 | D0 to D2047 | RESERVED | 15×1048 |

FIG.5

FRAGMENT ITEM

| BYTE POSITION | DESCRIPTION | BYTES |
|---|---|---|
| B0 to B3 | FRAGMENT ITEM DESCRIPTOR | 3 |
| B3 to B4 | FRAGMENT NUMBER | 2 |
| B5 to B7 | FRAGMENT START ADDRESS | 3 |
| B8 to B10 | FRAGMENT END ADDRESS | 3 |
| B11 to B15 | RESERVED | 5 |

FIG.6

PREVIOUS SESSION ITEM

| BYTE POSITION | DESCRIPTION | BYTE |
|---|---|---|
| B0 to B2 | PREVIOUS SESSION ITEM | 3 |
| B3 | RESERVED | 1 |
| B4 | PREVIOUS SESSION NUMBER | 1 |
| B5 to B7 | PREVIOUS SESSION START ADDRESS | 3 |
| B8 to B10 | PREVIOUS SESSION END ADDRESS | 3 |
| B11 to B15 | RESERVED | 5 |

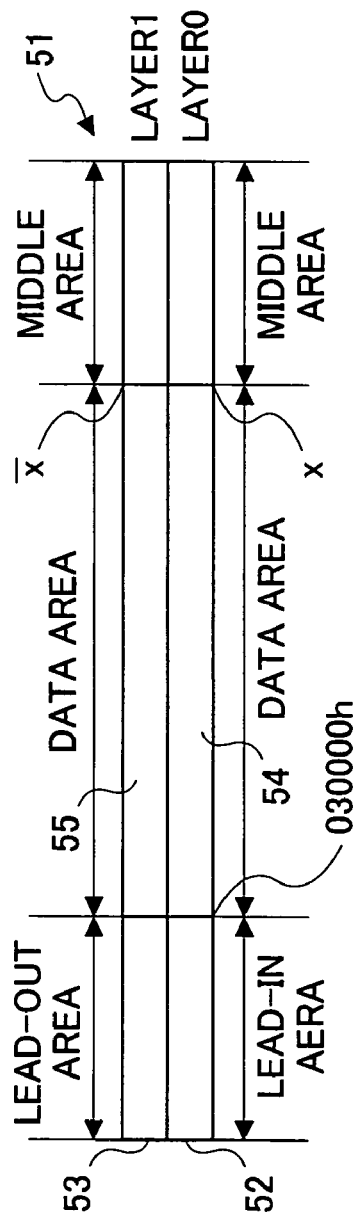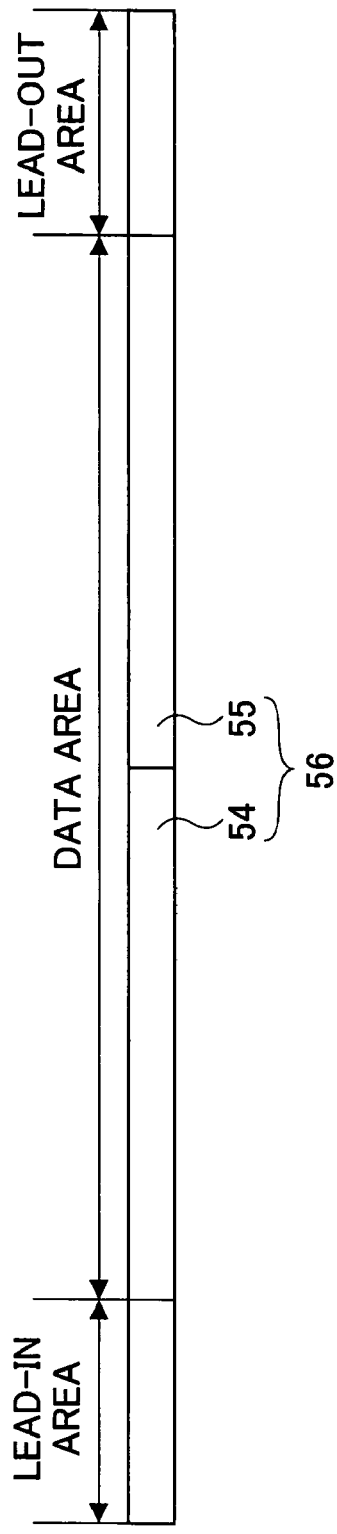

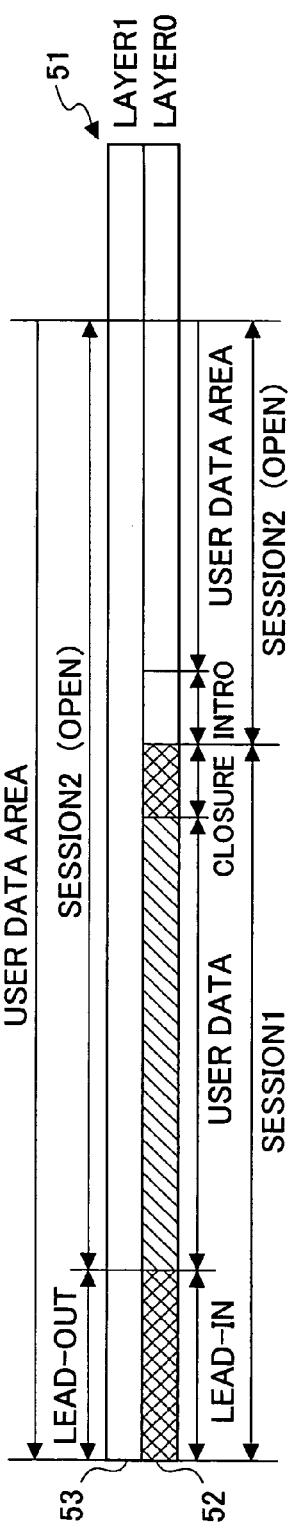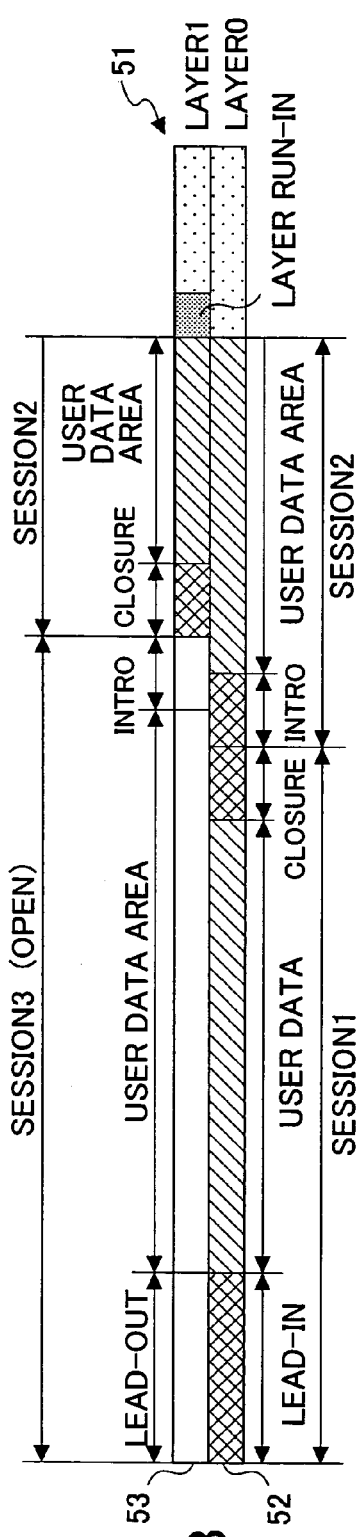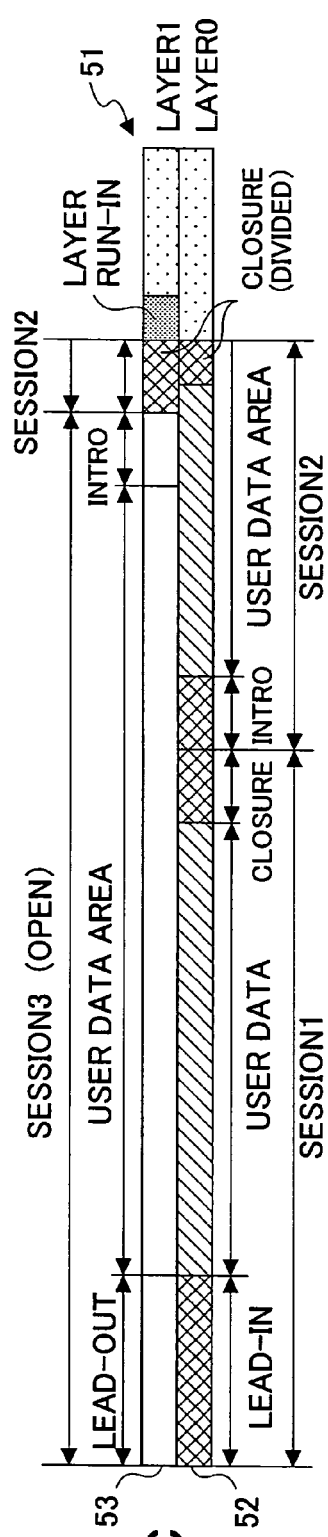

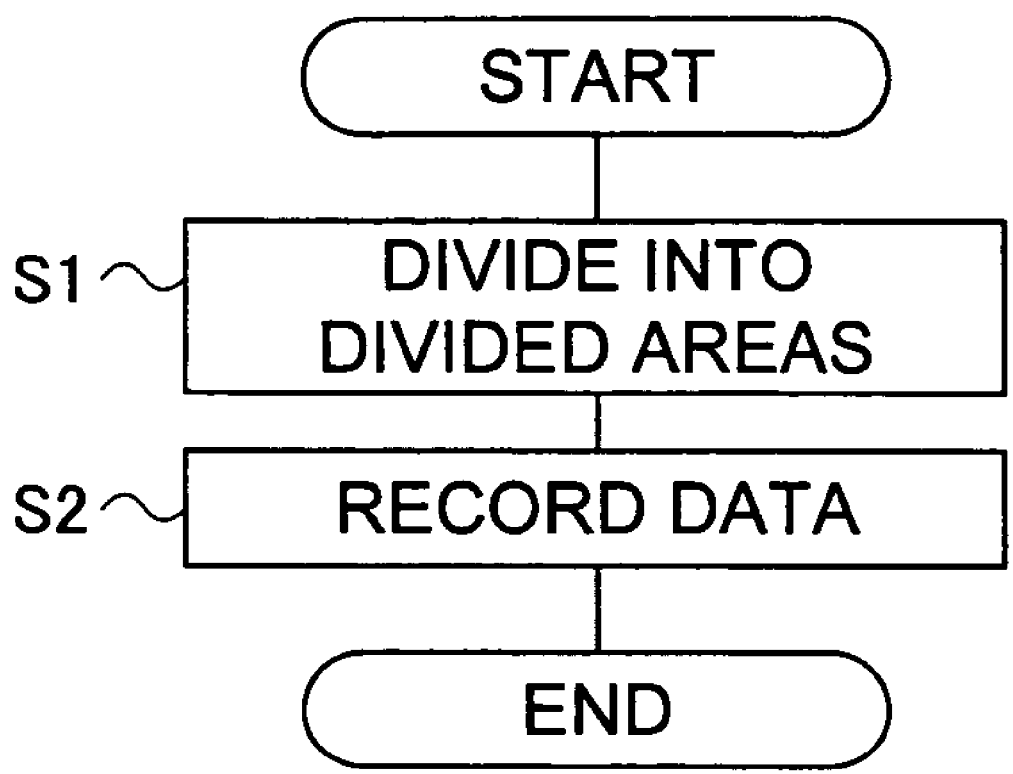

MULTIPLE LAYERS OPTICAL RECORDING FOR RECORDING DATA OVER TWO OR MORE LAYERS

CROSS-REFERNCE TO RELATED APPLICATION

This application is a U.S. continuation application filed under 35 USC 111(a) claiming benefit under 35 USC 120 and 365(c) of PCT application JP2004/002824, filed Mar. 5, 2004, which claims priority to Japanese Patent Application No. 2003-083305 filed on Mar. 25, 2003, Japanese Patent Application No. 2003-150355 filed on May 28, 2003, and Japanese Patent Application No. 2003-353504 filed on Oct. 14, 2003. The foregoing applications are hereby incorporated herein by reference.

BACKGROUND OF THE INVENTION

1. Field of the Invention

The present invention relates to an optical information recording method and apparatus for recording data on an optical information recording medium that includes plural recording layers each having a data area for recording information, an information processing apparatus implementing such an optical information recording apparatus, an optical information recording medium that includes plural recording layers each having a data area for recording information, a program that is run on a computer of an optical information recording apparatus to administer data recording on the data areas of such an optical information recording medium, and a recording medium storing such a program.

2. Description of the Related Art

Japanese Laid-Open Patent Publication No. 2001-126255 discloses an information recording apparatus that records data on an optical information recording medium having plural recording layers, wherein recording is conducted on the recording layers starting from a recording layer that is positioned away from a light incidence side with respect to the other one or more recording layers of the medium in order to prevent degradation of the quality of the recorded data.

Examples of recordable disks conforming to the DVD standard include the DVD+R. A DVD+R has physical characteristics that are similar to those of a DVD-ROM, and can thereby maintain good compatibility with a DVD-ROM drive. Since the DVD+R corresponds to a write-once medium that does not allow rewriting of data, data are sequentially recorded in the DVD+R.

To enable a DVD-ROM drive to read data that are recorded as files, an area for recording file information is reserved at the beginning of a session, and when the session is closed, the file information of the recorded data is recorded in the reserved area according to a conventional method.

As is described above, data are sequentially recorded in the DVD+R from the inner radius side of the disk. In such case, by dividing the recording area of the disk into plural tracks (in the DVD+R the tracks are referred to as fragments), and recording data on these tracks, a front area of a session may be recorded later.

Also, even when a session is closed, a new session may be added so that additional data may be recorded after closing a session. Such recording methods used by the DVD+R are referred to as a multi-track recording method and a multi-session recording method.

Presently, much research and development are being conducted to increase the speed and capacity of recordable disks such as the DVD+R. As one exemplary proposal for achieving such objects, a one-sided dual layer DVD+R having two recording layers on one side (referred to as dual layer DVD+R hereinafter) that is capable of maintaining playback compatibility with a one-sided dual layer playback-only (read-only) DVD is provided.

The dual layer DVD+R has a storage capacity of 8.4 Gbytes, whereas a conventional single-layer DVD+R has a storage capacity of 4.7 Gbytes. This means that the storage capacity of the dual layer DVD+R is nearly double the storage capacity of the convention single layer DVD+R. The data recorded on the dual layer DVD+R may be read by a DVD player or a DVD-ROM drive that is capable of replaying a dual layer playback-only (read-only) DVD.

In a dual layer DVD+R, a logical address is successively assigned from the start address of a first recording layer data area, and a consecutive logical address continuing from the logical address assigned to the end address of the first recording layer data area is assigned to the start address of the second recording area data layer. Accordingly, upon recording data on a dual layer DVD+R, a user may not have to be aware of the existence of two separate recording layers.

In recording data on a dual layer DVD+R, the data areas of the recording layers of the DVD+R are divided into plural divided areas that may correspond to fragments or sessions, for example. In such case, the division into divided areas is preferably realized in a manner such that a user may not have to be aware of the existence of two separate recording layers.

For example, in the case of dividing the data areas into fragment units, the user may designate a fragment size according to a conventional fragment division method. Accordingly, an incomplete fragment corresponding to a last fragment within a data area is divided into a reserved fragment having the designated size and a new incomplete fragment.

In a case where the start address of the last fragment is located within the data area of the first recording layer, the reserved fragment may extend beyond the first recording layer data area depending on its prescribed data size. However, since the first recording layer data area is fixed, data may not be recorded beyond the first recording layer data area.

The existence of such restrictions on fragment division means that a user has to keep track of the range of the data areas of the recording layers. This in turn creates an inconvenience for the user.

SUMMARY OF THE INVENTION

To counter such problems of the related art, the data areas of the two recording layers may be handled as a single continuous data area. If division into fragments or sessions, for example, may be realized across the two recording layers, the user may not have to take into account the existence of plural recording layers upon dividing the data areas into fragments and sessions for data recording.

In the DVD+R, a lead-in of a session corresponding to a second session or a session thereafter is referred to as an "intro" and a lead-out of a session that comes before the last session is referred to as a "closure". The intro and closure correspond to data containing one or more user data attributes and are recorded according to a predetermined recording format.

When recording data on a DVD+R, normally, data are recorded in the form of one or more files. In such case, file management information for managing user data information is recorded in a file management area that is provided separately from the area for recording the actual user data.

The file management information is generally recorded in a predetermined area within a session (e.g., the first 16 sectors of a user data area). In a case of recording a session according to the multi-session recording method, the file management information is updated and recorded in a predetermined area of a new session.

In other words, file management information existing within a given session may include the file management information pertaining to the user data recorded within the given session as well as the file management information pertaining to the user data recorded in one or more sessions coming before the given session.

Thus, in order to read a file from a multi-session DVD, a start address of the last session is determined.

A drive that is compatible with the multi-session DVD+R may be able to detect multi-session information (e.g., the start address and end address of each session) and provide information of the last session to the user. However, even in a conventional DVD-ROM drive that is incompatible with the multi-session DVD+R, special driver software (such driver software may be referred to as 'multi-session driver') may be used to enable a user to gain access to the information of the last session.

In the multi-session driver, a user data size of a first session, a closure size of the first session, and an intro size of a next session are referenced to determine a start address of the next session, and an area located at a predetermined position within the intro of the next session is replayed to acquire information on a size of the next session from the session information recorded in this area.

Through such session detection process, sessions recorded on a disk may be successively tracked to detect the last session. This process can be realized owing to the fact that the intro and closure of a session include user data attributes (so that user data may be identified in a conventional DVD-ROM drive), and the fact that the intro size and the closure size are fixed.

It is also noted that in the dual layer DVD+R as described above, when the data areas of the two recording layers are handled as a single continuous data area for conducting session division thereon, an intro or a closure of a session may cross over the two recording layers. In order to be able to detect the last session using a multi-session DVD+R non-compatible drive and a multi-session driver even under such circumstance, the intro or the closure may be divided into portions that are respectively recorded in the two data areas.

Accordingly, it is an object of the present invention to provide an optical information recording technique for recording data on an optical information recording medium that includes plural recording layers each having a data area for recording information, the technique enabling division into fragments or sessions across plural recording layers for data recording so that a user may not have to be aware of the existence of plural recording layers.

A first specific object of the present invention is to provide an optical information recording method for recording data on an optical information recording medium that includes plural recording layers having data areas for recording data, the method including:

a division step of handling at least two data areas of the data areas of the recording layers as a single continuous data area and dividing the continuous data area into plural divided areas; and a recording step of recording data on the divided areas.

A second specific object of the present invention is to provide an optical information recording apparatus that is adapted to record data on an optical information recording medium that includes plural recording layers having data areas for recording data, the apparatus including:

a division part that handles at least two data areas of the data areas of the recording layers as a single continuous data area and divides the continuous data area into plural divided areas; and a recording part that records data on the divided areas.

A third specific object of the present invention is to provide an information processing apparatus that includes an optical information recording apparatus that is adapted to record data on an optical information recording medium that includes plural recording layers having data areas for recording data, the information processing apparatus including:

a division part that handles at least two data areas of the data areas of the recording layers as a single continuous data area and divides the continuous data area into plural divided areas; and a recording part that records data on the divided areas.

A fourth specific object of the present invention is to provide an optical information recording medium that includes plural recording layers having data areas for recording data, wherein at least two data areas of the data areas of the recording layers are handled as a single continuous data area, the continuous data area being divided into plural divided areas, and data being recorded in the divided areas.

A fifth object of the present invention is to provide a program or a recording medium recording the program that is run on a computer that controls an optical information recording apparatus that is adapted to record data on an optical information recording medium that includes plural recording layers having data areas for recording data, the program including procedures for administering the optical information recording apparatus to execute:

a division step of handling at least two data areas of the data areas of the recording layers as a single continuous data area and dividing the continuous data area into plural divided areas; and a recording step of recording data on the divided areas.

According to the optical information recording method of the present invention, division into divided areas such as fragments and sessions may be conducted over plural recording layers, and thereby, a user may not have to be aware of the existence of plural recording layers upon recording data in units of the divided areas such as fragments or sessions.

According to an embodiment of the optical information recording method of the present invention, division into divided areas such as fragments and sessions may be conducted over plural recording layers, and thereby, a user may not have to be aware of the existence of plural recording layers upon recording user data in units of the divided areas such as fragments or sessions.

According to another embodiment of the optical information recording method of the present invention, even in a case where a first or second predetermined area crosses over plural recording layers, the corresponding predetermined area may be divided into portions and recorded in the plural layers. Thereby, the first and second predetermined areas may be properly recorded within the data areas in their predetermined data sizes. Accordingly, a position of a last session may be accurately detected even in a case of detecting the last session using a multi-session driver.

According to another embodiment of the optical information recording method of the present invention, even when a lead-in or a lead-out crosses over plural recording layers, the corresponding lead-in or lead-out may be divided into portions and recorded. Thereby, the lead-in and lead-out may be properly recorded within the data areas in their predetermined sizes. Accordingly, a position of a last session may be accurately detected even in a case of detecting the last session using a multi-session driver.

According to another embodiment of the optical information recording method of the present invention, even when an intro or a closure crosses over plural recording layers, the corresponding intro or closure may be divided into portions and recorded. Thereby, the intro and the closure may be properly recorded within the data areas in their predetermined sizes. Accordingly, a position of a last session may be accurately detected even in a case of detecting the last session using a multi-session driver.

According to another embodiment of the present invention, a third predetermined area located in between a pair of adjacent divided areas and belonging to neither of the divided areas is provided, and even in a case where this third predetermined area crosses over plural recording layers, the corresponding third predetermined area may be divided into portions and recorded so that the third predetermined area may be properly recorded within the data areas in its predetermined size. Accordingly, a start address of a user data area may be accurately determined even in a system that determines the start address of the user data area based on the data size of the third predetermined area.

It is noted that other objects, features, and advantages of the present invention are described below in the description of preferred embodiments with reference to the accompanying drawings.

BRIEF DESCRIPTION OF THE DRAWINGS

FIGS. 2A~2C are diagrams showing layouts of conventional playback-only DVDs;

FIG. 4 is a table showing a format of a session disk control block;

FIG. 5 is a table showing a format of a fragment item;

FIG. 6 is a table showing a format of a previous session item;

FIGS. 7A and 7B are diagrams showing configurations of a dual layer DVD+R;

FIGS. 8A~8C are diagrams illustrating a session division that is realized by an optical information recording/playback apparatus according to an embodiment of the present invention;

FIG. 10 is a flowchart illustrating an optical information recording method according to an embodiment of the present invention that is conducted by the optical information recording/playback apparatus of FIG. 1;

DESCRIPTION OF THE PREFERRED EMBODIMENTS

In the following, preferred embodiments of the present invention are described with reference to the accompanying drawings.

Figure 1:
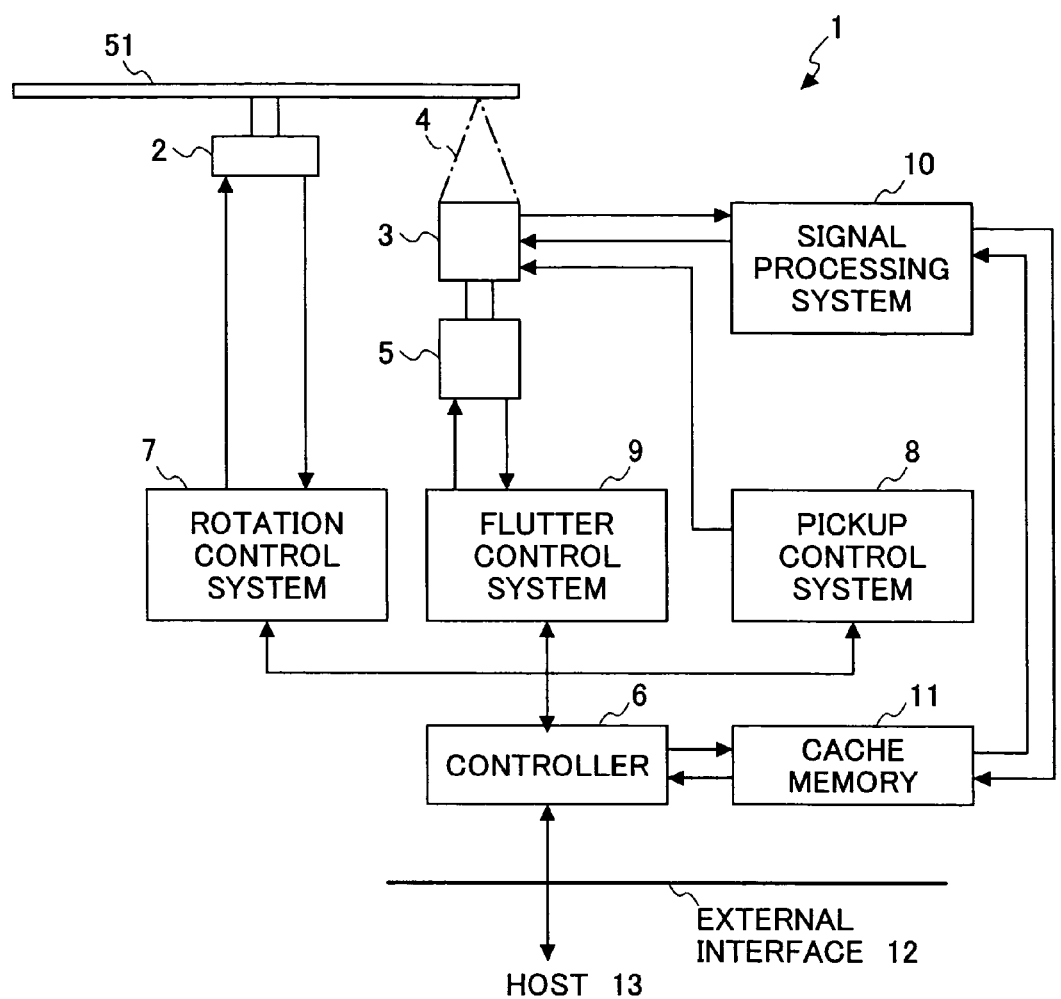
FIG. 1 is a block diagram showing a configuration of an optical information recording recording/playback apparatus according to an embodiment of the present invention.

FIG. 1 is a block diagram showing a configuration of an optical information recording/playback apparatus according to an embodiment of the present invention.

The optical information recording/playback apparatus 1 of FIG. 1 is adapted to conduct information recording/playback operations on an optical disk 51. The optical information recording/playback apparatus 1 includes a motor 2 for rotating the optical disk 51, an optical pickup 3 for irradiating laser light 4 on the optical disk 51, a flutter motor 5 that moves the optical pickup 3 in a radial direction with respect to the optical disk 51, and a control system that controls the above components.

The control system of the optical information recording/playback apparatus 1 may be include a microcomputer as a main component, a controller 6 that centrally controls the components of the apparatus, and control systems that are controlled by the controller 6 such as a rotation control system 7, a pickup control system 8, a flutter control system 9, and a signal processing system 10.

The rotation control system 7 is adapted to control the operation of the motor 2 that rotates the optical disk 51. The pickup control system 8 is adapted to control the operation of the optical pickup 3 that irradiates the laser light 4 on the optical disk 51. The flutter motor control system 9 is adapted to control the operation of the flutter motor 5 that moves the optical pickup 3 in a radial direction with respect to the optical disk 51.

The signal processing system 10 is adapted to receive the laser light 4 that is irradiated from the optical pickup 3, controlled by the pickup control system 8, and reflected by the optical disk 51 using a light receiving element (not shown), and process the received light signal. The signal processing system 10 stores data read from the optical disk 51 in a cache memory 11.

The controller 6 is adapted to transfer the data stored in the cache memory 11 to a host apparatus 13 that is connected to the optical information recording/playback apparatus 1 via an external interface 12.

FIGS. 2A~2C are diagrams illustrating layouts of conventional playback-only (read-only) DVDs.

FIG. 2A shows a one-sided single layer disk 101 (referred to as 'single layer disk' hereinafter); FIG. 2B shows a one-sided dual layer disk 201 that uses a Parallel Track Path (PTP) method (referred to as 'PTP disk' hereinafter); and FIG. 2C shows a one-sided dual layer disk 301 that uses an Opposite Track Path (OTP) method (referred to as 'OTP disk' hereinafter).

Each of the disks 101, 201, and 301 has an information area that includes a lead-in area, a data area, and a lead-out area. In the single-layer disk 101 and the PTP disk 201, an information area is provided in each recording layer; specifically, in the PTP disk 201, an information area is provided in each of layer 0 (202) and layer 1 (203).

In the OTP disk 301, one information area is provided over the recording layers 302 and 303 (layer 0 and layer 1), and a middle area is provided at an outer radius portion of the data area of each of the recording layers 302 and 303. Data playback is conducted from an inner radius side to an outer radius side of the disk for the single layer disk 101, the PTP disk 201, and layer 0 (recording layer 302) of the OTP disk 301, and data playback is conducted from the outer radius side to the inner radius side for layer 1 (recording layer 303) of the OTP disk 301.

On each of the recording layer of the single layer disk 101 and the recording layers 202 and 203 of the PTP disk 201, physical addresses (physical sector numbers) are consecutively assigned from the lead-in area to the lead-out area.

As for the OTP disk 301, physical addresses are consecutively assigned from the lead-in area to the middle area of layer 0, and bit-reversed addresses of the physical addresses of layer 0 are assigned to layer 1 of the OTP disk 301. That is, the physical addresses of layer 1 increase in value from the middle area to the lead-out area.

Referring to FIG. 2B, in the PTP disk 201, the start addresses of the lead-in areas of layer 0 and layer 1, the end addresses of the lead-in areas of layer 0 and layer 1, the start addresses of the data areas of layer 0 and layer 1, and the end addresses of the lead-out areas of layer 0 and layer 1 are respectively located at the same radial positions. The start addresses of the lead-out areas (i.e., the end addresses of the data areas) may vary depending on each recording layer 202 (layer 0) or 203 (layer 1). In the case where the end addresses of the data areas vary, lead-out data are recorded in an area corresponding to the difference between the data areas.

Referring to FIG. 2C, in the OTP disk 301, the start address of the lead-in area of layer 0 and the end address of the lead-out area of layer 1, the data area end address of layer 0 and the data area start address of layer 1, the start addresses of the middle areas of layer 0 and layer 1, and the end addresses of the middle areas of layer 0 and layer 1 (recording layers 302 and 303) are respectively located at the same radial positions. The data area start address of layer 0 and the data area end address of layer 1 do not necessarily have to correspond. In the case where the addresses vary, lead-out data are recorded in the difference area, as in the case of the PTP disk 201.

Figure 3A:
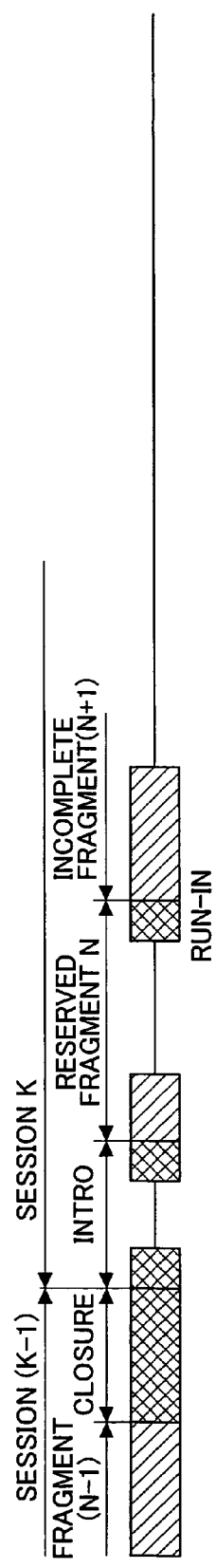
FIGS. 3A~3C are diagrams illustrating fragment division states of an optical disk according to an embodiment of the present invention.
Figure 3B:
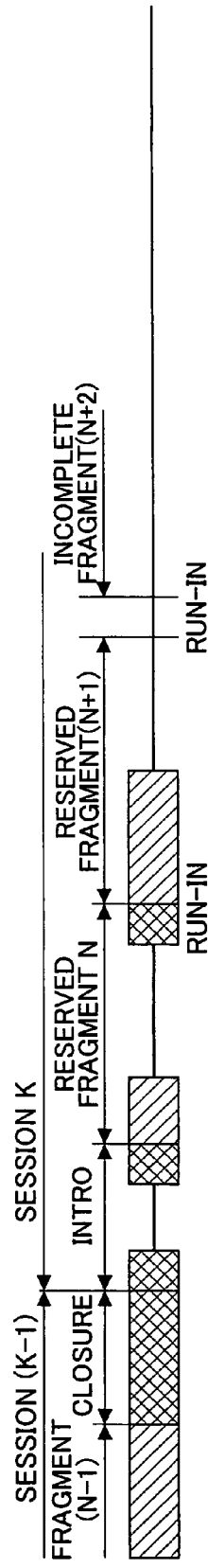
Figure 3C:
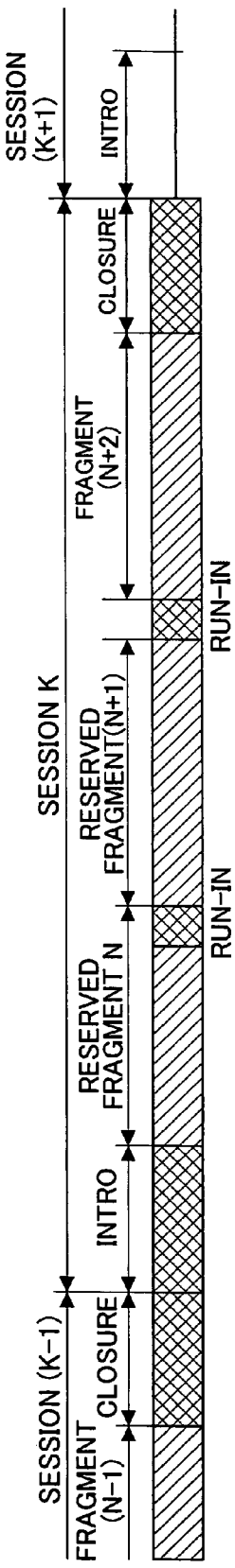

FIGS. 3A~3C are diagrams illustrating an example of dividing a data area into fragments in an optical disk according to an embodiment of the present invention.

Fragments may be defined as reserved fragments or incomplete fragments according to their recording states.

A reserved fragment corresponds to a fragment of which a start address and an end address are determined. Information on such fragment is registered in a fragment item within a Session Disk Control Block (SDCB), which is described later.

An incomplete fragment corresponds to a fragment of which only a start address is determined. In an incomplete fragment, the end address of the data area is provisionally designated as the end address of the fragment. In the case of dividing a data area into plural fragments, an incomplete fragment is further divided into a reserved fragment and an incomplete fragment.

FIG. 3A shows fragments already existing on the optical disk 51 before conducting a fragment division process. In this example, a reserved fragment N and an incomplete fragment (N+1) exist within an open session K for which data recording is not completed.

In recording user data on a DVD+R, data are recorded in unrecorded areas of fragments.

Referring to FIG. 3B, in the case of dividing the data area into fragment units, the incomplete fragment (N+1) of FIG. 3A is divided into a reserved fragment (N+1) and a new incomplete fragment (N+2).

The start address of the reserved fragment (N+1) is the same as the start address of the incomplete fragment (N+1) of FIG. 3A, and the size of the reserved fragment (N+1) has to be larger than the size of the data area within the incomplete fragment (N+1) on which data are already recorded.

By dividing the data area into fragments (N+1) and (N+2), information on the reserved fragment (N+1) may be newly registered in the SDCB. In the case where the contents of the SDCB are updated, the updated SDCB is recorded in a predetermined area within an intro of the new reserved fragment. Also, a run-in block and a new incomplete fragment (N+2) are provided after the reserved fragment (N+1). The run-in block may be recorded upon recording data in the incomplete fragment (N+2).

FIG. 3C illustrates an example of dividing the data area into plural sessions. In this example, the open session K of FIGS. 3A and 3B is divided into a session K for which data recording is completed, and a new open session (K+1).

To realize this process, at least data recording has to be completed within the session K. That is, the open session K may be closed by recording data in the areas within the reserved fragments of the fragments existing in the open session K, and determining an end address of the incomplete fragment (N+2). When the end address of the incomplete fragment (N+2) is determined, information on the fragment (N+2) may be registered in the SDCB.

To complete data recording for the open session K, predetermined data may be recorded in an unrecorded area within the intro of session K, and a closure may be recorded after the fragment (N+2). The intro and closure correspond to areas including data attributes. In a case where a new session is not recorded after the session K, a lead-out may be recorded instead of a closure.

FIG. 4 is a table showing a format of a session disk control block (SDCB).

As is shown in FIG. 4, the SDCB includes plural session items that are each made up of 16 bytes of data. The session items include a fragment item that indicates fragment information pertaining to a fragment within a relevant session, and a previous session item that indicates session information pertaining to a session coming before the relevant session.

FIG. 5 is a table showing a format of a fragment item. The fragment item includes a fragment item descriptor, a fragment number, a fragment start address, and a fragment end address. The fragment descriptor corresponds to ID information indicating that the recorded information represents a fragment item and may be recorded as "FGR", for example. The fragment number indicates a fragment number, and the fragment start address and the fragment end address respectively indicate the start address and the end address of the fragment.

As is described above, information on reserved fragments are registered in the SDCB. Accordingly, in the case of FIG. 3A, a fragment item that indicates information on the fragment N is registered in the SDCB. In the case of FIG. 3B, two fragment items respectively indicating information on the fragment N and the fragment (N+1) are registered in the SDCB. In the case of FIG. 3C, three fragment items respectively indicating information on the fragment N, the fragment (N+1), and the fragment (N+2) are registered in the SDCB.

FIG. 6 is a table showing a format of a previous session item. The previous session item includes a previous session item descriptor, a previous session number, a previous session start address, and a previous session end address. The previous session item descriptor corresponds to ID information indicating that the recorded information represents a previous session item, and may be recorded as "PRS", for example.

The previous session number indicates a session number, and the previous session start address and the previous session end address respectively indicate the start address and the end address of the session.

In the SDCB, each set of session information pertaining to each of sessions preceding a relevant session is recorded as a previous session item, and in the example of FIGS. 3A~3C, (K−1) types of previous session items that respectively indicate information pertaining to sessions 1 through (K−1) are registered in the SDCB.

FIGS. 7A and 7B are diagrams illustrating an exemplary configuration of the optical disk 51 corresponding to a dual layer DVD+R.

Referring to FIG. 7A, the optical disk 51 has plural recording layers (i.e., recording layer 52 and recording layer 53, in this example) that are each capable of recording information. In the following, the optical disk 51 is described as corresponding to a dual layer DVD+R using the OTP method.

FIG. 7A shows an unrecorded state of the optical disk 51 corresponding to a dual layer DVD+R including layer 0 (recording layer 52) and layer 1 (recording layer 53). In layer 0, a lead-in area, a data area, and a middle area are provided from the inner radius side to the outer radius side. In layer 1, a middle area, a data area, and a lead-out area are provided from the outer radius side to the inner radius side.

In these areas, consecutive physical addresses are assigned in a manner similar to that used in the dual layer DVD-ROM shown in FIG. 2C. That is, a physical address 30000h is assigned as the start address of the data area of layer 0 and the physical address value is successively incremented from the lead-in area side of layer 0 to the middle area side of layer 0.

As the data area start address of layer 1, a bit-reversed address of the end address of the data area of layer 0 is assigned, and the physical address value is successively incremented with respect to the value of this data area start address from the middle area side to the lead-out area side.

Also, a logical address that is designated by a user upon recording data is provided. Specifically, the data area start address 30000h of layer 0 is used as a basis to assign a logical address 0h to the data area start address of layer 0. From this start address, the logical address value is successively incremented over the data area of layer 0.

Further, a consecutive logical address continuing from the logical address assigned to the data area end position of layer 0 is assigned as the logical address of the data area start position of layer 1, and from this start position, the logical address value is successively incremented over the data area of layer 1.

FIG. 7B shows a state of the data area of the optical disk 51 when data recording is conducted thereon using the optical information recording/playback apparatus 1.

In this example, the logical addresses consecutively assigned over the two recording layers 52 and 53 are used, and the respective data areas 54 and 55 of the recording layers 52 and 53 are handled as a quasi-continuous single data area 56, as is illustrated in FIG. 7B.

Upon recording data on the optical disk 51, the quasi-continuous single data area 56 is divided into plural divided areas (e.g., fragments and/or sessions) to record user data. The division into fragment units and/or session units may be realized according to the methods described above.

FIGS. 8A, 8B, and 8C are diagrams illustrating division of the data area into sessions realized by the optical information recording/playback apparatus 1 according to an embodiment of the present invention.

A session in a DVD+R includes a lead-in area, a user data area, and a lead-out area. In a multi-session DVD+R, an intro including user data attributes is recorded instead of a lead-in for the second session and onward. Also, a closure is recorded instead of a lead-out for the sessions before the last session.

FIG. 8A illustrates a state in which data recording of one session in layer 0 is completed. As is shown in FIG. 8A, the first session ends with a closure. Since a new session may be additionally recorded on the optical disk 51, unrecorded areas of the second session and onward are handled as an open session 2. The data area end address of layer 1 may be provisionally designated as the end address of the user data area of open session 2.

FIG. 8B shows a case in which the open session 2 is further divided into two sessions wherein a user data area of a newly provided session 2 crosses over the recording layers 52 and 53. In this example, the session division is realized by recording data in the unrecorded areas of the fragments existing within session 2 and recording an intro and a closure respectively at the beginning and end of the user data area. Also, a new open session 3 may be provided after the data-recording-completed session 2.

As is illustrated, data recording may be realized by setting a user data area for recording user data in the session 2 corresponding to a divided area. In a case where the user data area crosses over the two data areas 54 and 55 (recording layers 52 and 53), the user data area may be divided into two, and the divided portions may respectively be recorded in the recording areas 54 and 55.

Upon recording data on the data area 55 of layer 1 (recording layer 53), a layer run-in including a data attribute of a middle area is recorded before the data area of layer 1 to enable playback of the data recorded at the start address of the data area of layer 1. The layer run-in may be recorded upon recording data in the data area of layer 1, for example.

Also, upon recording the intro and closure of session 2, data may be recorded in the middle areas of layer 0 and layer 1 to enable playback of the recorded data using a conventional DVD-ROM drive.

FIG. 8C shows a state of a divided session in which a single closure crosses over the two recording layers 52 and 53.

In a given session, an intro (first predetermined area in which first predetermined data are to be recorded) is provided in front of a user data area, and a closure (second predetermined area in which second predetermined data are to be recorded) is provided at the rear end of the user data area. In a case where an intro or a closure crosses over the two recording layers 52 and 53, the corresponding intro or closure may be divided into two portions and the divided portions may respectively be recorded in the data areas of the two recording layers 52 and 53.

In a DVD+R, an intro and a closure respectively have fixed data sizes, and the optical information recording/playback apparatus 1 may use the fixed data sizes as references to detect the start address of the user data area of a session.

Accordingly, even in a case where an intro or a closure crosses over the recording layers 52 and 53, the start address of a user data area of a session may be properly detected by dividing the corresponding intro or closure into two portions and recording the divided portions in the data areas 54 and 55, respectively.

FIGS. 9A, 9B, 9C, and 9D are diagrams illustrating a division into fragments realized by the information recording/playback apparatus 1 according to an embodiment of the present invention.

In a DVD+R, 16 fragments may be recorded within one session at the maximum. A run-in block corresponding to a 1 ECC block of dummy data including a user data attribute is provided between each pair of adjacent fragments.

In other words, a run-in block is not provided before the first fragment within a session and after the last fragment within a session. Also, it is noted that the run-in block corresponds to an area that is independent of the adjacent fragments.

Figure 9A:
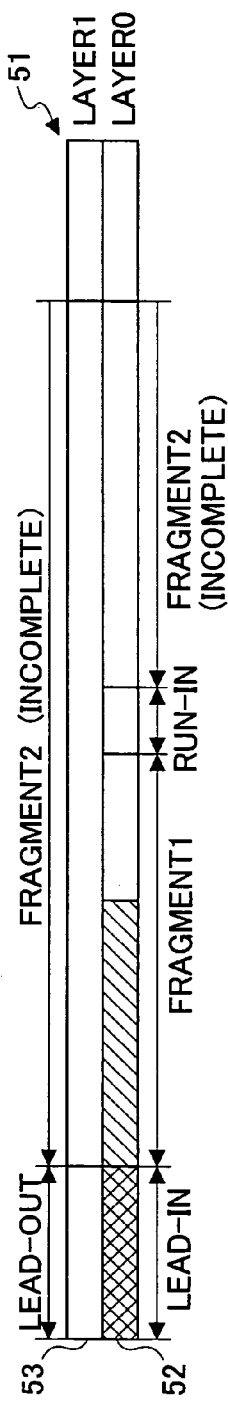
FIGS. 9A~9D are diagrams illustrating a fragment division that is realized by the optical information recording/playback apparatus of the present embodiment.

FIG. 9A shows a state of the optical disk 51 having a reserved fragment 1 of which a start address and an end address are determined. The unrecorded area after the fragment 1 is handled as an incomplete fragment 2, and the data area end address of layer 1 is provisionally set as the end address of fragment 2.

Of the fragments existing within a session, information on a fragment of which an end address is determined, namely, the reserved fragment 1 in this example, is recorded in the SDCB. Also, in the present example, a run-in block is provided between fragment 1 and fragment 2, and this run-in block is recorded upon recording user data in fragment 2.

Figure 9B:
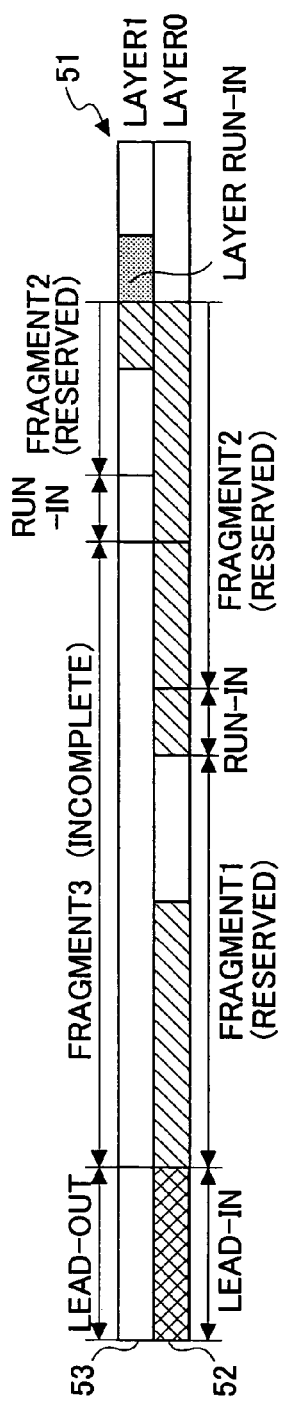

FIG. 9B shows a state of the optical disk 51 in a case where the incomplete fragment 2 is further divided into two fragments, and a user data area of the new reserved fragment crosses over the recording layers 52 and 53 (data areas 54 and 55). In this example, an end address of the incomplete fragment 2 is determined so that a reserved fragment 2 is set. At this point information on the reserved fragment 2 is additionally registered in the SDCB, and the updated SDCB is recorded at the predetermined area. Also, a new incomplete fragment 3 is generated after the reserved fragment 2.

Upon recording data on the data area 55 of layer 1, a layer run-in may be recorded before the data area 55 in order to enable playback of data recorded at the start address of the data area 55. The layer run-in may be recorded upon recording data on the data area 55.

Figure 9C:
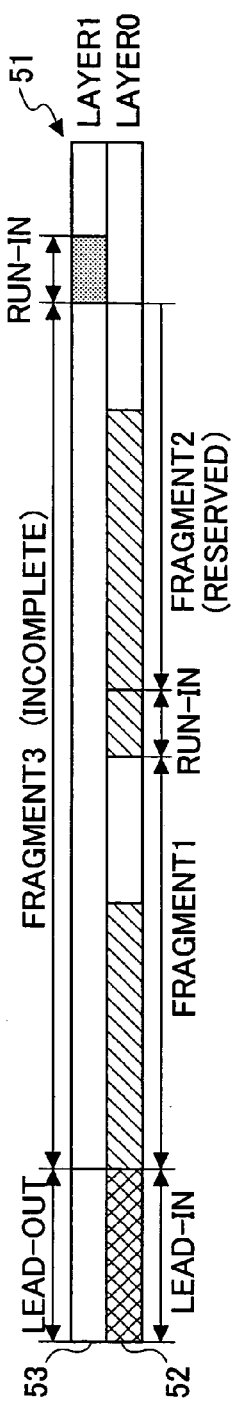

FIG. 9C shows a case in which a fragment division occurs at the border between the recording layers 52 and 53. In this example, a run-in block is provided between the reserved fragment 2 and the incomplete fragment 3, that is, at the start address of the data area 55 of layer 1. This run-in block (third predetermined data) may be provided at the middle area of layer 1 that is positioned before the data area 55 of layer 1 (third predetermined area), (or alternatively, the run-in block may be provided at the head portion of the data area of layer 1). In such case, data including a data attribute of the middle area may be recorded as the run-in block upon recording user data in fragment 3.

In a DVD+R, the start address and end address of a fragment are recorded in the SDCB, and thereby, the start address of a fragment may be obtained by referring to the information recorded in the SDCB.

Once a session is closed, data recorded within the session may be read based on file management information that is recorded at a predetermined position from the start address of the session. In a DVD+R, the fragment information of a session for which data recording is completed may not be so important; that is, the fragment information may be more important at the time fragment division is conducted on an open session to record data.

Accordingly, when the data area start address of the second recording layer 53 corresponds to a run-in block in a fragment division, the run-in block may not necessarily have to be recorded within the data area 55.

Thus, according to the present embodiment, when the data area start address of the second recording layer 53 corresponds to a run-in block in a fragment division, the run-in block may be recorded before the data area 55 of the second recording layer 53 so that data recorded at the data area start address of the second recording layer 53 may be properly replayed.

Figure 9D:
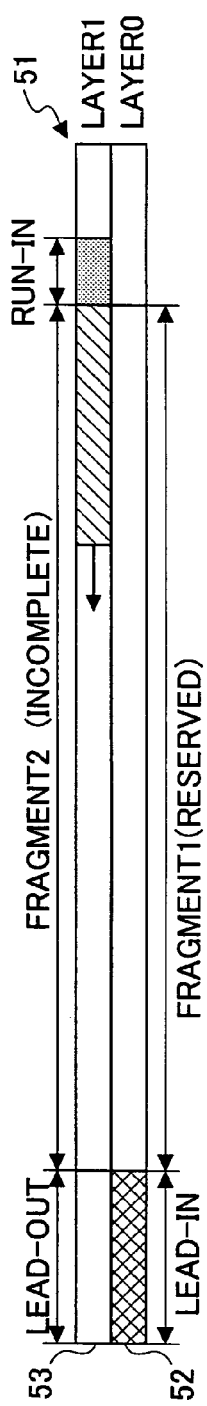

FIG. 9D shows an example of a particular method for recording a run-in block in a case where fragment division for data recording is intentionally conducted starting from the second recording layer 53 (layer 1). In this example, fragment division is conducted at the border between the data areas 54 and 55. In such case, as is illustrated in FIG. 9D, the data area 54 of layer 0 may correspond to a reserved fragment 1. A run-in block may be recorded in an area within the middle area of layer 1 that is positioned right before the data area 55 of layer 1 (recording layer 53), and the data area 55 of layer 1 may correspond to an incomplete fragment 2. By conducting data recording from the incomplete fragment 2, data may be recorded from the second recording layer 53.

FIG. 10 is a flowchart illustrating an optical information recording method according to an embodiment of the present invention that is executed by the optical information recording/playback apparatus 1 of FIG. 1.

The process of FIG. 10 may correspond to an optical information recording method that is executed by the controller 6 of the optical information recording/playback apparatus 1 of FIG. 1. According to this example, the controller 6 handles the two data areas 54 and 55 of the two recording layers 52 and 53 of the optical disk 51 as a continuous single data area 56 to divide the data area 56 into plural divided areas, namely, into session units and/or fragment units (step S1).

The controller 6 then conducts data recording on the divided areas, i.e., sessions and/or fragments, according to the schemes described above with reference to FIGS. 7A–9D (step S2).

Figure 11:
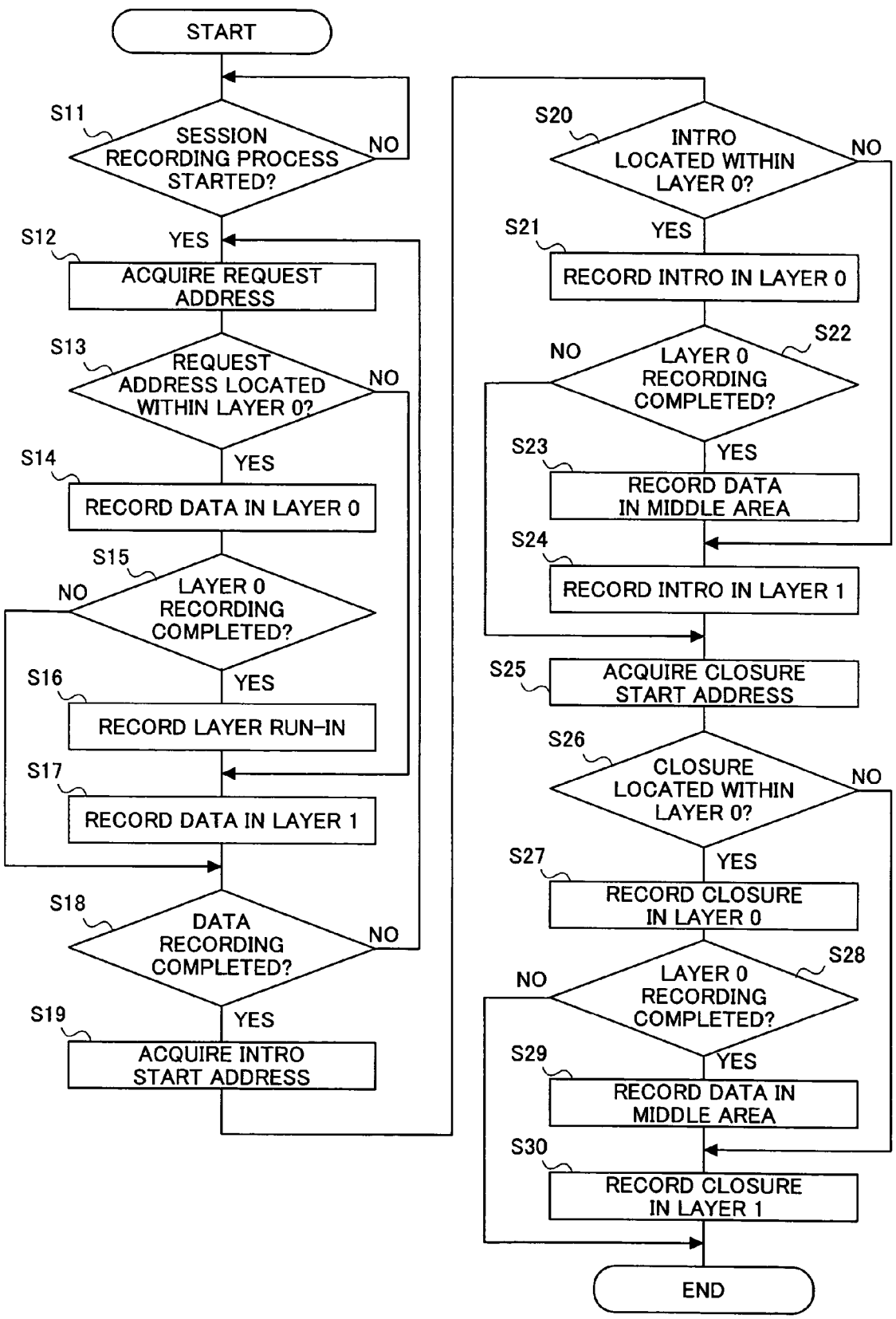
FIG. 11 is a flowchart illustrating an exemplary process for a case in which the optical information recording/playback apparatus of FIG. 1 conducts data recording in session units.

FIG. 11 is a flowchart illustrating a specific example of a process flow of step S2 of FIG. 10 in which data recording in session units is conducted, the process being executed by the optical information recording/playback apparatus 1.

The data recording process of FIG. 11 may be conducted on sessions other than the first session and the last session in a multi-session recording process. In this example, an intro and a closure may be respectively recorded at the beginning and end of a user data area. Also, in the example of FIG. 11, it is assumed that further division of the sessions into fragments is not conducted.

When a session recording is started (step S11, YES), the controller 6 acquires a request address (step S12).

Then, the controller 6 determines whether the request address corresponds to an address within layer 0 (step S13). If the controller 6 determines that the request address corresponds to an address within layer 0 (step S13, YES), it records data in a predetermined area within the layer 0 (step S14).

During the data recording step S14, the controller 6 determines whether data recording on the data area of layer 0 is completed (step S15). When the data recording on layer 0 is completed, the controller moves on to data recording on layer 1. Herein, before moving on to data recording on the data area 55 of layer 1, a layer run-in block of a predetermined size is recorded in a middle area of layer 1 as is illustrated in FIGS. 9A–9D (step S16). Then, the controller 6 goes on to recording data in the data area 55 of layer 1 (step S17).

If it is determined in step S15 that the data recording on layer 0 is not completed, the process moves on to step S18.

Also, if it is determined in step S13 that the request address is located within layer 1, the controller 6 conducts data recording on a predetermined area within layer 1 (step S17)

Then, the controller 6 determines whether the data recording for the relevant session is completed (step S18). If the data recording is not completed, the controller 6 goes back to step S12, and repeats the process of acquiring a request address and recording data.

If it is determined that the data recording is completed in step S18, the process moves on to a session termination process. Specifically, the controller 6 acquires an intro start address (step S19). Then, the controller 6 determines whether the intro start address is within layer 0 (step S20).

If it is determined in step S20 that the intro start address is within layer 0, the controller 6 records an intro in a predetermined area within layer 0 (step S21).

During the intro recording process, the controller 6 determines whether data recording on the data area of layer 0 is completed (step S22).

If it is determined in step S22 that the data recording on layer 0 is completed, the process moves on to data recording on layer 1. In this transition, the controller 6 records data in the middle areas of layer 0 and layer 1 (step S23). Then, the controller 6 records the remaining intro portion in the data area of layer 1 (step S24).

If it is determined in step S22 that the intro recording process is completed within layer 0, the process moves on to step S25. Also, if it is determined that the intro start address is located within layer 1 (step S20, NO), the intro is recorded at a predetermined address within layer 1 (step S24).

Then, the session termination process goes on to recording a closure. Specifically, this process involves acquiring a closure start address (step S25), and determining whether the closure start address is located within layer 0 (step S26). If it is determined that the closure start address is located within layer 0 (step S26, YES), a closure is recorded in a predetermined area within layer 0 (step S27). Then, it is determined whether data recording is completed for layer 0 on which the closure recording is conducted (step S28), and if it is determined that the data recording on layer 0 is completed (step S28, YES), the process moves on to data recording on layer 1. In this transition, data recording is conducted on the middle areas of layer 0 and layer 1 (step S29), after which the remaining closure portion is recorded in the data area of layer 1 (step S30). On the other hand, if it is determined that the closure recording is completed within layer 0 (step S28, NO), the process sequence is ended. Also, if it is determined that the closure start address is within layer 1 (step S26, NO), the process moves on to step S30, and a closure is recorded at a predetermined area within layer 1 (step S30). When the session termination process is completed, the process sequence is ended.

By conducting the process steps described above, for example, user data, a run-in block, an intro, a closure, and middle area data may be recorded on the optical disk 51. The recording may be conducted according to the methods illustrated in FIGS. 7A~9D.

In the present example, data recording in session units for sessions other than the first session and the last session is described. It is noted that processes similar to the above process may be used in recording data in the first session and the last session. Specifically, in the case of recording data in the first session, a lead-in may be recorded instead of an intro, and in the case of recording data in the last session, a lead-out may be recorded instead of a closure. The recording of a lead-in and a lead-out may be conducted in a manner similar to that for recording an intro and a closure as is illustrated by FIGS. 8A~8C.

Also, it is noted that in the session termination process according to the present example, data are recorded in each middle area of each recording layer 52 and 53. However, data recording does not necessarily have to be conducted on all portions of the middle areas; rather, data may be recorded in a portion of the middle areas as long as playback compatibility may be maintained with a conventional DVD-ROM drive.

Also, it is noted that the present example illustrates a data recording process for a dual layer DVD+R using the OTP method. However, the optical disk 51 may also correspond to a dual layer DVD+R using the PTP method. In such case, a layer run-in block of the second recording layer 53 may be recorded in the lead-in area of the second recording layer 53, and in a case where a session crosses over the two recording layers 52 and 53, data may be recorded in the lead-out area of layer 0 and the lead-in area of layer 1 rather than the middle areas.

Figure 12:
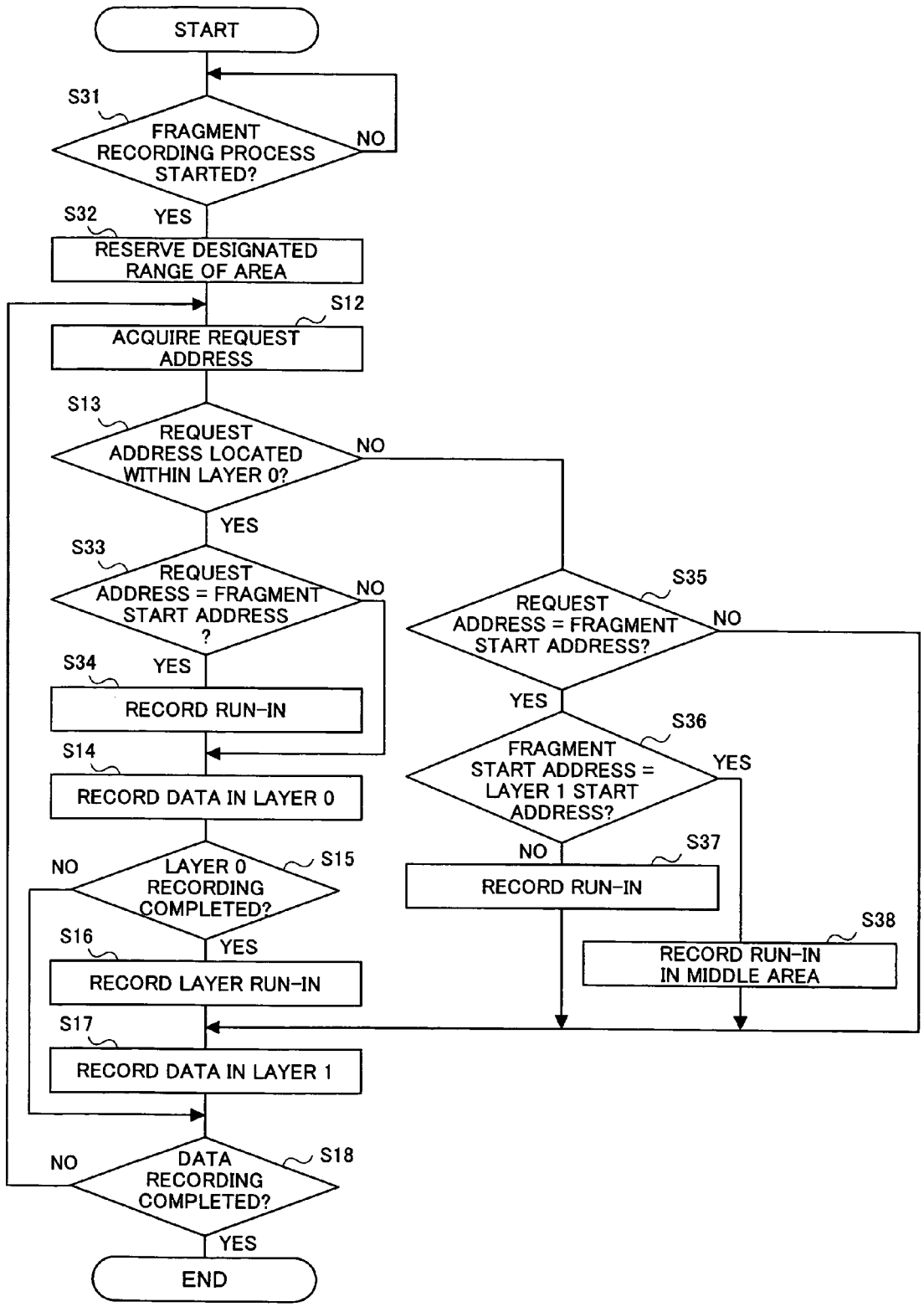
FIG. 12 is a flowchart illustrating an exemplary process for a case in which the optical information recording/playback apparatus of FIG. 1 conducts data recording in fragment units.

FIG. 12 is a flowchart illustrating a case of recording data in fragment units in the data recording process of step S2 in FIG. 10. The present example describes a case in which data recording is conducted on a reserved fragment that is obtained by dividing an incomplete fragment into a reserved fragment and a new incomplete fragment in step S1 of FIG. 10. Also, it is noted that in FIG. 12, the same numerical references are assigned to process steps that are identical to the process steps of FIG. 11.

When fragment recording is started (step S31, YES), a fragment of a designated size is reserved (step S32). In this reserving process, the respective data areas 54 and 55 of layer 0 and layer 1 (recording layers 52 and 53) are regarded as a single quasi-continuous data area 56, and thereby, a divided fragment may cross over the recording layers 52 and 53. Next, a request address is acquired (step S12), and it is determined whether the acquired request address corresponds to an address located within layer 0 (step S13). If it is determined that the request address corresponds to an address located within layer 0 (step S13, YES), it is further determined whether the request address corresponds to a fragment start address (step S33). If it is determined that the request address corresponds to a fragment start address (step S33, YES), a run-in block is recorded right before the fragment (step S34), and data recording on layer 0 is conducted (step S14). On the other hand, if it is determined that the request address does not correspond to a fragment start address (step S33, NO), the process moves directly on to step S14.

During the data recording process, it is determined whether data recording on the data area 54 of layer 0 is completed (step S15), and if it is determined that data recording on layer 0 is completed (step S15, YES), the process moves on to data recording on layer 1. In this transition, a layer run-in block having a predetermined size is recorded in an area located right before the data area of layer 1, that is, in the middle area of layer 1 (step S16), after which the data recording on the data area 55 of layer 1 is conducted (step S17). On the other hand, if it is determined that recording on layer 0 is not completed (step S15, NO), the process moves on to step S18.

If it is determined that the request address corresponds to an address located within layer 1 (step S13, NO), it is further determined whether the request address corresponds to a fragment start address (step S35). If it is determined that the request address does not correspond to a fragment start address (step S35, NO), data recording on a predetermined area of layer 1 is conducted (step S17). On the other hand, if it is determined that the request address corresponds to a fragment start address (step S35, YES), it is further determined whether the request address corresponds to a data area start address of layer 1 (step S36). If the request address does not correspond to the data area start address of layer 1 (step S36, NO), a run-in block is recorded at a predetermined address within the data area 55 of layer 1 (step S37). If the request address corresponds to the data area start address of layer 1 (step S36, YES), a run-in block is recorded in an area located right before the data area of layer 1, that is, in the middle area of layer 1 (step S38), after which the data recording on the data area of layer 1 is conducted (step S17). After the above-described data recording process is completed, it is determined whether data recording is completed for the fragment (step S18), and if it is determined that recording on the fragment is not completed (step S18, NO), the process sequence of acquiring a request address and conducting data recording (step S12 and onward) is repeated. When it is determined that the data recording is completed (step S18, YES), the process sequence is ended.

In the process sequence according to the present example, data such as user data and a run-in block may be recorded according to the methods illustrated in FIGS. 7A~9D.

It is noted that although the present example describes a case in which data recording is conducted on the reserved fragment that is obtained from the reserving process, the data recording process may be conducted in a similar manner with respect to a new incomplete fragment generated from the fragment reserving process. Also, the fragment reserving process and the data recording process do not necessarily have to be successively conducted, that is, the processes may be independently conducted as well. Also, although a data recording method for a dual layer DVD+R using the OTP method is described in the present example, the present invention may also be applied to a dual layer DVD+R using the PTP method. Also, it is noted that the run-in block that is recorded right before the data area may correspond to a layer run-in block.

Figure 13:
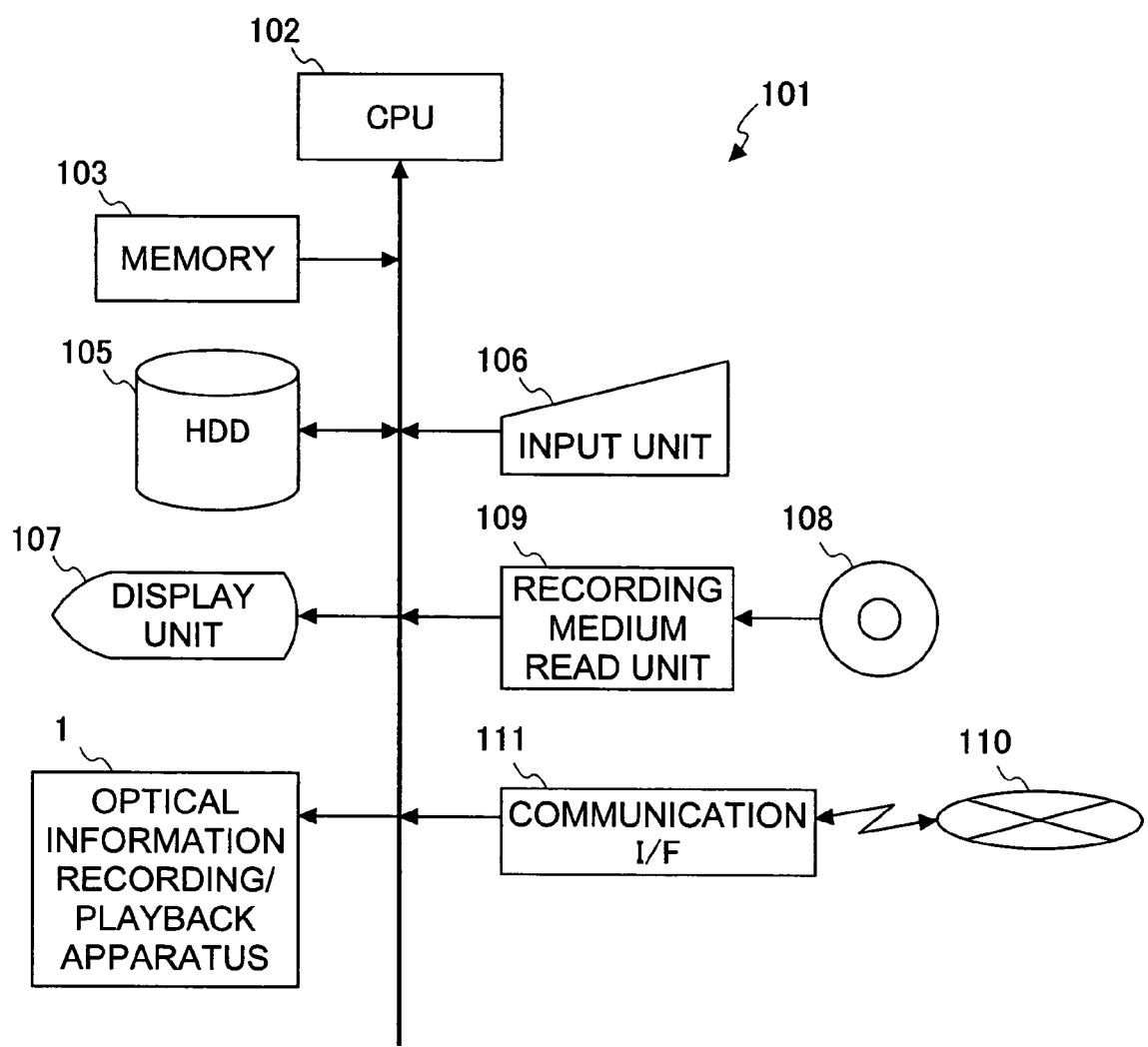
FIG. 13 is a block diagram showing a configuration of an information processing apparatus according to an embodiment of the present invention that includes the optical information recording/playback apparatus of FIG. 1.

FIG. 13 is a block diagram illustrating a configuration of an information processing apparatus 101 according to an embodiment of the present invention that implements the optical information recording/playback apparatus of FIG. 1.

As is illustrated in FIG. 13, the information processing apparatus 101 includes a CPU 102 that may correspond to a personal computer, for example, and is adapted to conduct various computational processes to centrally control each component part of the apparatus; a memory 103 that may include various types of ROMs and RAMs; and a bus 104 for interconnecting the CPU 102 and the memory 103.

The bus 104 is also connected via predetermined interfaces to a magnetic storage unit 105 such as a hard disk drive (HDD), an input unit including a mouse and a keyboard, for example, a display unit 107 such as an LCD or a CRT, and a recording medium read unit 109 that is adapted to read a recording medium 108 such as an optical disk.

The bus 104 is also connected to a predetermined communication interface 111 that is adapted to establish communication with a network 110. The communication interface 111 may be connected to a WAN (wide area network) such as the Internet via the network 110.

As the recording medium 108, various types of media including optical disks such as CDs and DVDs, magneto-optical disks, and flexible disks may be used. Also, the recording medium read unit 109 may correspond to an optical disk drive, a magneto-optical disk drive, or a flexible disk drive, for example, according to the type of recording medium 108.

In the information processing apparatus 101 of FIG. 13, the recording medium read unit 109, and the optical information recording/playback apparatus 1 are shown as separate units. However, the recording medium read unit 109 and the optical information recording/playback apparatus 1 may alternatively be unified into a single unit.

In the above descriptions of preferred embodiments, it is assumed that the methods illustrated in FIGS. 7A~12 are executed by the controller 6 of the optical information recording/playback apparatus 1. However, in an alternative example, the methods of FIGS. 7A~12 may be realized by control processes executed by the information processing apparatus 101 operating according to a control program recorded in the magnetic storage unit 105.

In such case, the control program recorded in the magnetic storage unit 105 corresponds to a program according to an embodiment of the present invention. The control program may be stored in a recording medium according to an embodiment of the present invention to be read by the recording medium read unit 109, or alternatively, the program may be downloaded from a WAN such as the Internet. The control program may then be installed in the information processing apparatus 101 and recorded in the magnetic storage unit 105. By completing this installation process, the information processing apparatus 101 may be able to execute the control processes for realizing the recording methods of FIGS. 7A~12. This control program may correspond to software that may be operated on a predetermined OS, or alternatively, the control program may correspond to a part of specific application software.

Also, in the above description of preferred embodiments, the optical disk 51 is described as a dual layer DVD+R using the OTP method, and thereby, the division into divided areas is conducted in session units or fragment units. However, the division may also be conducted in track units as well.

Further, although the above preferred embodiments are described as being applied to a DVD+R as the optical disk 51, the optical information recording method, optical information recording apparatus, information processing apparatus, optical information recording medium, program, and recording medium of the present invention is not limited to the applications described above, and they may be applied to other various types of optical disks such as a DVD+RW, or a DVD-R/RW.

What is claimed is:

1. An optical information recording method for recording data on an optical information recording medium that includes a plurality of recording layers, each of the recording layers having a data area, a lead-in or lead-out area, the method comprising the steps of:
    recording first predetermined data or second predetermined data of a data set over at least two of the data areas of the plurality of recording layers, the data set comprising user data, the first predetermined data, and the second predetermined data, and the first predetermined data being recorded before the user data and the second predetermined data being recorded after the user data, wherein the first predetermined data or the second predetermined data is recorded outside said lead-in or lead-out area; and
    switching from a first data area of a first recording layer of the plurality of recording layers to a second data area of a second recording layer of the plurality of recording layers while recording the first predetermined data or the second predetermined data;
    wherein recording of the first predetermined data or the second predetermined data is started on the first data area and completed on the second data area.

2. An optical information recording method for recording data on an optical information recording medium that includes a plurality of recording layers, each of the recording layers having a data area, a lead-in or lead-out area, the method comprising the steps of:
    recording first predetermined data or second predetermined data of a data set over at least two of the data areas of the plurality of recording layers, the data set comprising user data, the first predetermined data, and the second predetermined data, and wherein the first predetermined data is recorded before the user data and the second predetermined data is recorded after the user data, and wherein the first predetermined data or the second predetermined data is recorded outside said lead-in or lead-out area; and switching from a first recording for recording the first predetermined data or the second predetermined data on a first data area of a first recording layer of the plurality of recording layers to a second recording for recording the first predetermined data or the second predetermined data on a second data area of a second recording layer of the plurality of recording layers while recording the first predetermined data or the second predetermined data.

3. The method of claim 2, wherein said data set comprises a session, and wherein said method comprises recording data in a plurality of sessions having a lead-in area and a lead-out area.

4. The method of claim 2, wherein said data set comprises a fragment, and wherein said method comprises recording data in a plurality of fragments, and recording a run-in block.

5. An optical information recording apparatus for recording data on an optical information recording medium that includes a plurality of recording layers, each of the recording layers having a data area, a lead-in or lead-out area, the apparatus comprising:

a recording part configured to record first predetermined data or second predetermined data of a data set over at least two of the data areas of the plurality of recording layers, the data set comprising user data, the first predetermined data, and the second predetermined data, and wherein the first predetermined data is recorded before the user data and the second predetermined data is recorded after the user data, and wherein the first predetermined data or the second predetermined data is recorded outside said lead-in or lead-out area; and a switching part configured to switch from a first data area of a first recording layer of the plurality of recording layers to a second data area of a second recording layer of the plurality of recording layers while recording the first predetermined data or the second predetermined data; and wherein recording of the first predetermined data or the second predetermined data is started on the first data area and completed on the second data area.

6. An optical information recording apparatus for recording data on an optical information recording medium that includes a plurality of recording layers, each of the recording layers having a data area, a lead-in or lead out-area, the apparatus comprising:

a recording part configured to record first predetermined data or second predetermined data of a data set over at least two of the data areas of the plurality of recording layers, the data set comprising user data, the first predetermined data, and the second predetermined data, and the first predetermined data being recorded before the user data and the second predetermined data being recorded after the user data, wherein the first predetermined data or the second predetermined data is recorded outside said lead-in or lead-out area; and a switching part configured to switch from a first recording for recording the first predetermined data or the second predetermined data on a first data area of a first recording layer of the plurality of recording layers to a second recording for recording the first predetermined data or the second predetermined data on a second data area of a second recording layer of the plurality of recording layers while recording the first predetermined data or the second predetermined data.

7. The method of claim 1, wherein the optical information recording medium conforms to a dual layer DVD+R standard having two recording layers.

8. An optical information recording method for recording data on an optical information recording medium that includes a plurality of recording layers, each of the recording layers having a data area, a lead-in or lead out area, the method comprising the steps of:

recording first predetermined data or second predetermined data of a data set over at least two of the data areas of the plurality of recording layers, the data set comprising user data, the first predetermined data, and the second predetermined data, and the first predetermined data being recorded before the user data and the second predetermined data being recorded after the user data, wherein the first predetermined data or the second predetermined data is recorded outside said lead-in or lead-out area; and switching from a first data area of a first recording layer of the plurality of recording layers to a second data area of a second recording layer of the plurality of recording layers while recording the first predetermined data or the second predetermined data;

wherein recording of the first predetermined data or the second predetermined data is started on the first data area and completed on the second data area; and wherein the recording step further comprises recording an intro as first predetermined data and a closure as second predetermined data, and wherein at least one of the recorded first predetermined data and the second predetermined data crosses over the first recording layer and the second recording layer.

9. The method of claim 2, wherein the optical information recording medium conforms to a dual layer DVD+R standard having two recording layers.

10. An optical information recording method for recording data on an optical information recording medium that includes a plurality of recording layers, each of the recording layers having a data area, a lead-in or lead-out area, the method comprising the steps of:

recording first predetermined data or second predetermined data of a data set over at least two of the data areas of the plurality of recording layers, the data set comprising user data, the first predetermined data, and the second predetermined data, and wherein the first predetermined data is recorded before the user data and the second predetermined data is recorded after the user data, and wherein the first predetermined data or the second predetermined data is recorded outside said lead-in or lead-out area; and switching from a first recording for recording the first predetermined data or the second predetermined data on a first data area of a first recording layer of the plurality of recording layers to a second recording for recording the first predetermined data or the second predetermined data on a second data area of a second recording layer of the plurality of recording layers while recording the first predetermined data or the second predetermined data; and wherein the recording step further comprises recording an intro as first predetermined data and a closure as second predetermined data, and wherein at least one of the recorded first predetermined data and the second predetermined data crosses over the first recording layer and the second recording layer.

11. The apparatus of claim 5, wherein the optical information recording medium conforms to a dual layer DVD+R standard having two recording layers.

12. An optical information recording apparatus for recording data on an optical information recording medium that includes a plurality of recording layers, each of the recording layers having a data area, a lead-in or lead-out area, the apparatus comprising:

a recording part configured to record first predetermined data or second predetermined data of a data set over at least two of the data areas of the plurality of recording layers, the data set comprising user data, the first predetermined data, and the second predetermined data, and wherein the first predetermined data is recorded before the user data and the second predetermined data is recorded after the user data, and wherein the first predetermined data or the second predetermined data is recorded outside said lead-in or lead-out area; and a switching part configured to switch from a first data area of a first recording layer of the plurality of recording layers to a second data area of a second recording layer of the plurality of recording layers while recording the first predetermined data or the second predetermined data; and wherein recording of the first predetermined data or the second predetermined data is started on the first data area and completed on the second data area; and wherein the recording further comprises recording an intro as first predetermined data and a closure as second predetermined data, and wherein at least one of the recorded first predetermined data and the second predetermined data crosses over the first recording layer and the second recording layer.

13. The apparatus of claim 6, wherein the optical information recording medium conforms to a dual layer DVD+R standard having two recording layers.

14. An optical information recording apparatus for recording data on an optical information recording medium that includes a plurality of recording layers, each of the recording layers having a data area, a lead-in or lead-out area, the apparatus comprising:

a recording part configured to record first predetermined data or second predetermined data of a data set over at least two of the data areas of the plurality of recording layers, the data set comprising user data, the first predetermined data, and the second predetermined data, and the first predetermined data being recorded before the user data and the second predetermined data being recorded after the user data, wherein the first predetermined data or the second predetermined data is recorded outside said lead-in or lead-out data; and a switching part configured to switch from a first recording for recording the first predetermined data or the second predetermined data on a first data area of a first recording layer of the plurality of recording layers to a second recording for recording the first predetermined data or the second predetermined data on a second data area of a second recording layer of the plurality of recording layers while recording the first predetermined data or the second predetermined data; and wherein the recording further comprises recording an intro as first predetermined data and a closure as second predetermined data, and wherein at least one of the recorded first predetermined data and the second predetermined data crosses over the first recording layer and the second recording layer.

15. The method of claim 1, wherein the recording step further comprises recording an intro as the first predetermined data and a closure as the second predetermined data.

16. The method of claim 2, wherein the recording step further comprises recording an intro as the first predetermined data and a closure as the second predetermined data.

17. The apparatus of claim 5, wherein the first predetermined data is an intro and the second predetermined data is a closure.

18. The apparatus of claim 6, wherein the first predetermined data is an intro and the second predetermined data is a closure.

* * * * *